(No Model.)
E. R. DRAVER.
CONVEYER.
No. 566,066. Patented Aug. 18, 1896.
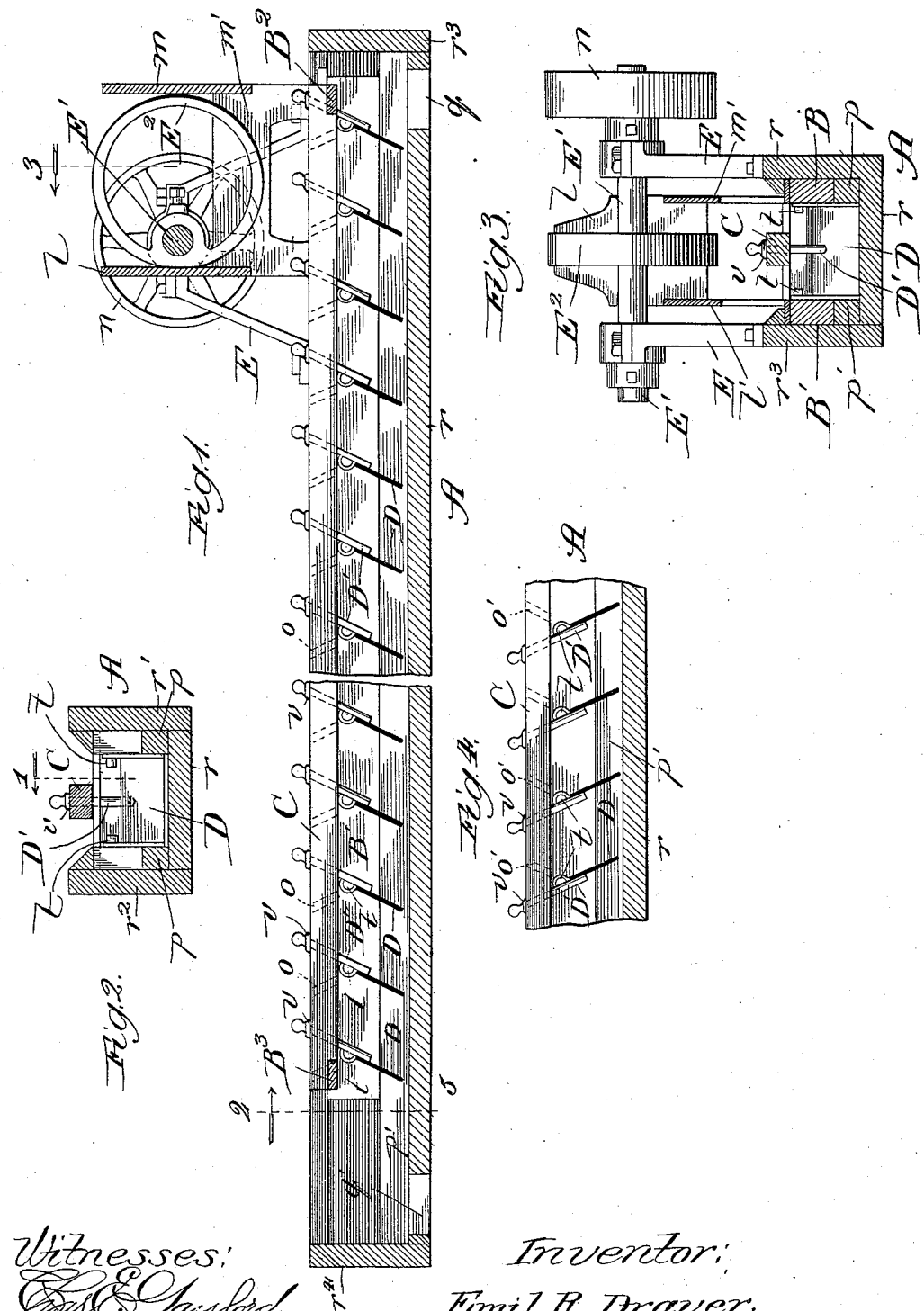
Witnesses:
Chas. E. Gaylord
Lute F. Alter
Inventor:
Emil R. Draver,
By Dyrenforth & Dyrenforth,
Attys.
THE NORRIS PETERS CO., PHOTO-LITHO., WASHINGTON, D. C.

UNITED STATES PATENT OFFICE.

EMIL R. DRAVER, OF ALLIANCE, NEBRASKA, ASSIGNOR TO FLORENCE N. DRAVER, OF SAME PLACE.

CONVEYER.

SPECIFICATION forming part of Letters Patent No. 566,066, dated August 18, 1896.

Application filed May 22, 1895. Serial No. 550,237. (No model.)

*To all whom it may concern:*

Be it known that I, EMIL R. DRAVER, a citizen of the United States, residing at Alliance, in the county of Boxbutte and State of Nebraska, have invented a new and useful Improvement in Conveyers, of which the following is a specification.

My invention relates to an improvement in the class of conveyers exemplified by the conveyer for which Letters Patent of the United States No. 538,822 were granted to me on the 7th day of May, 1895, and the construction of which involves a receptacle for the loose material (such as flour, meal, and analogous products, or sand, cement, and the like) and a series of shovel-gates pivotally suspended in the receptacle to bear against relatively-stationary back-stops, whereby reciprocation, one with relation to the other, of the receptacle and series of shovel-gates causes the latter, in one stroke of the reciprocable part, to glide over the material and in the other stroke, by being braced against the stops, to dig into the material and advance or convey it, in the receptacle, toward the discharge therefrom.

The object of my present invention is to improve upon my aforesaid patented construction primarily in the matter of providing for moving the stops to effect reversal of the direction of action of the shovel-gates.

Referring to the accompanying drawings, Figure 1 is a broken view in longitudinal sectional elevation of my improved conveyer, the section being taken at the line 1 on Fig. 2 and viewed in the direction of the arrow; Fig. 2, a section taken at the line 2 on Fig. 1 and viewed in the direction of the arrow; Fig. 3, a section taken at the line 3 on Fig. 1 and viewed in the direction of the arrow; and Fig. 4, a broken section of the conveyer as represented in Fig. 1, showing the shovel-gates in their reversed position.

A is the receptacle for the material to be conveyed, represented in the form of a rectangular box having a bottom $r$, provided with discharge-openings $q$ and $q'$ near its opposite ends, sides $r'$ and $r^2$, and closed ends $r^3$ and $r^4$. Along the opposite inner sides of the box A there extend throughout the length of the box stationary rails $p$ and $p'$, affording ways for side bars B and B', imposed upon them to be longitudinally reciprocable thereon, the length of the side bars being less than that of the box to afford to them play therein.

$B^2$ and $B^3$ are cross-bars connecting the side bars near their opposite ends, and C is a bar extending lengthwise centrally of the box, being fastened at its opposite ends to the cross-bars. At intervals in the bar C are provided openings $o$, extending obliquely in one direction, and adjacent to each opening $o$ is another opening $o'$, extending obliquely in the opposite direction, thus affording two series of openings with the members of both preferably in alinement and the members of one series extending in an oppositely-oblique direction to those of the other series.

D D are the shovel-gates, pivotally supported from the side bars B B', each being so supported below and adjacent to an opening in the bar C on studs $t$, projecting inward from the reciprocable side bars. D' D' are the stops, shown as headed pins with collars $v$ arranged to seat flatwise on the upper surface of the bar C when the pins are inserted into the oblique openings $o$ or $o'$, into which they are removably or withdrawably inserted to cause each to extend toward its lower projecting end into contact with the surface of a shovel-gate and afford a back-stop.

For reciprocating the shovel-gates with relation to the receptacle A, I show a frame E, rigidly fastened on the box near one end and having journaled in it a rotary drive-shaft E', carrying at one end a belt-pulley $n$ and between its ends an eccentric $E^2$, confined between upright plates $m$ and $l$, extending, respectively, between the opposite ends of a pair of side plates $m'$ and $l'$, fastened at their lower edges to the side bars B and B', whereby the latter are reciprocated, and with them the shovel-gates, by rotating the shaft E'. Any other suitable form of driving means may, however, be employed for the same purpose without departure from my invention.

The material to be conveyed and introduced for the purpose into the receptacle is dug into by the shovel-gates in their stroke, wherein they are braced by the stops behind them, and thus moved along toward a discharge-outlet $q$ or $q'$, depending on the side at which the shovel-gates are so braced, and the movement of the shovel-gates in the opposite direction causes them to glide over the surface of the material.

The removable construction of the stops D' enables them to be transposed from the openings o into the openings o' to permit reversal of the shovel-gates, as represented in Fig. 4, to effect conveyance of the material in the opposite direction, and, if desired, one-half or any portion of the stops may be set to cause the conveying action of the shovel-gates in one direction, and the other portion may be set to effect such action in the opposite direction, thereby causing conveyance of the material in each stroke of the apparatus.

What I claim as new, and desire to secure by Letters Patent, is—

1. In a conveyer, the combination with the box, of shovel-gates D pivotally supported therein to be reciprocated together and reversible on their pivots to extend, in either position of their reversal, obliquely to the bottom of the box, a reciprocable bar C movable with said shovel-gates and provided with oblique openings o and o', pins D' affording stops removably adjustable in said openings, and driving means for imparting the reciprocating motion to said shovel-gates and bar, substantially as described.

2. In a conveyer, the combination with the box A, of connected side bars B and B' reciprocably supported therein, shovel-gates D pivotally supported on said side bars to extend between them and reversible on their pivots to extend, in either position of their reversal, obliquely to the bottom of the box, a bar C connected with said side bars to be reciprocated with them and provided with oblique openings o and o', pins D' affording stops removably adjustable in said openings, and driving means for imparting the reciprocating motion, substantially as described.

EMIL R. DRAVER.

In presence of—
H. C. DRAVER,
E. W. DRAVER.